(12) United States Patent
Furui

(10) Patent No.: US 9,883,154 B2
(45) Date of Patent: Jan. 30, 2018

(54) PROJECTION SYSTEM, PROJECTOR, AND IMAGE ADJUSTMENT METHOD

(71) Applicant: Seiko Epson Corporation, Tokyo (JP)

(72) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/397,411

(22) Filed: Jan. 3, 2017

(65) Prior Publication Data

US 2017/0208304 A1    Jul. 20, 2017

(30) Foreign Application Priority Data

Jan. 20, 2016  (JP) ................................. 2016-008574

(51) Int. Cl.
*H04N 3/223*  (2006.01)
*H04N 9/31*   (2006.01)

(52) U.S. Cl.
CPC ......... *H04N 9/3185* (2013.01); *H04N 9/3147* (2013.01); *H04N 9/3182* (2013.01)

(58) Field of Classification Search
CPC ... H04N 9/3185; H04N 9/3147; H04N 9/3182
USPC ....................................................... 348/747
See application file for complete search history.

(56) References Cited

U.S. PATENT DOCUMENTS

| 6,558,006 B2 | 5/2003 | Ioka | |
| 2012/0319997 A1* | 12/2012 | Majumder | H04N 9/3147 345/175 |
| 2013/0076789 A1* | 3/2013 | Majumder | H04N 9/3147 345/633 |
| 2015/0029465 A1* | 1/2015 | Ishikawa | G06T 3/005 353/30 |
| 2015/0229890 A1* | 8/2015 | Ohno | G09G 5/14 348/742 |

FOREIGN PATENT DOCUMENTS

| JP | 2002-072359 A | 3/2002 | |
| JP | 2003315914 A * | 11/2003 | ............. G03B 21/10 |

* cited by examiner

*Primary Examiner* — Michael Lee
(74) *Attorney, Agent, or Firm* — ALG Intellectual Property, LLC

(57) ABSTRACT

A projection system includes a plurality of projectors adapted to project respective images arranged on a projection surface, a control device, and an imaging section, the plurality of projectors is classified into N (N is no smaller than 2) projector groups, the control device makes the projector groups project adjusting images on the projection surface at respective timings different from each other, and then makes the imaging section sequentially image the projection surface on which the adjusting images are projected, at least one of the N projector groups includes two or more projectors, and the two or more projectors project the adjusting images at respective positions not adjacent to each other in the projection surface.

10 Claims, 8 Drawing Sheets

PROJECTION SYSTEM, PROJECTOR, AND IMAGE ADJUSTMENT METHOD

The entire disclosure of Japanese Patent Application No. 2016-008574, filed Jan. 20, 2016 is expressly incorporated by reference herein.

BACKGROUND

1. Technical Field

The present invention relates to a projection system, a projector, and an image adjustment method.

2. Related Art

There has been known a projection system for projecting a seamless large screen using a plurality of projectors (JP-A-2002-072359). In such a projection system, it is generally performed to automatically measure and then correct differences in color and brightness between the projectors, a shift in the projection position between the projectors to dispose the projectors so as to overlap the boundary part of the projectors adjacent to each other to thereby make the junction inconspicuous.

However, if measurement patterns are projected together with the adjacent projector when measuring the characteristics of the respective projectors, the measurement patterns overlap each other, and there is a problem that it is unachievable to measure the correct characteristics.

SUMMARY

An advantage of some aspects of the invention is to solve the problem described above, and the invention can be implemented as the following aspects.

(1) According to an aspect of the invention, a projection system is provided. The projection system includes a plurality of projectors adapted to project respective images arranged on a projection surface, a control device, and an imaging section, the plurality of projectors is classified into N (N is no smaller than 2) projector groups, the control device makes the projector groups project adjusting images on the projection surface at respective timings different from each other, and then makes the imaging section sequentially image the projection surface on which the adjusting images are projected, at least one of the N projector groups includes two or more projectors, and the two or more projectors project the adjusting images at respective positions not adjacent to each other in the projection surface.

According to this aspect of the invention, since the two or more projectors for projecting the adjusting images at the same timing project the adjusting images at the respective positions not adjacent to each other in the projection surface, it is possible to perform correct measurement. Further, since the adjusting images are projected for each of the projector groups, it is possible to shorten the time for taking the adjusting images.

(2) In the aspect of the invention, that the control device may perform an image adjustment, which includes at least one of an adjustment of a color projected, and an adjustment of a position shift of the image projected, on each of the projectors based on a taken image, which the imaging section is made to take.

(3) In the aspect of the invention, in a case in which the value of N is 4, and the positions of the images projected on the projection surface by the plurality of projectors are arranged in a matrix, the plurality of projectors may be classified into four projector groups based on whether a row number and a column number of an arrangement position of the image in the matrix arrangement of the images are each an even number or an odd number.

In general, in the case of performing projection on the projection surface using a plurality of projectors, the positions of the images projected on the projection surface are arranged in a matrix in many cases. According to the aspect of the invention with the configuration described above, in such a case, by performing the classification into the four projector groups based on whether the row number and the column number of the arrangement position are each an even number or an odd number in the matrix arrangement of the images, it is possible to reduce the number of projector groups to shorten the time for taking the adjusting images.

(4) In the aspect of the invention, in a case in which the value of N is 2, and the positions of the images projected on the projection surface by the plurality of projectors are arranged in one of a single row and a single column, the plurality of projectors may be classified into two projector groups based on whether an arrangement position of the image in the arrangement of the images is an even-numbered position or an odd-numbered position.

According to the aspect of the invention with this configuration, in the case in which the projection images by the projectors are arranged in a single row or a single column, by performing the classification into two projector groups based on whether the arrangement position of the image in the arrangement of the images is an odd-numbered position or an even-numbered position, it is possible to reduce the number of the projector groups to shorten the time for taking the adjusting images.

(5) In the aspect of the invention, the control device may be a control section provided to one of the plurality of projectors.

According to the aspect of the invention with this configuration, the control device separate from the projector is unnecessary.

(6) In the aspect of the invention, the imaging section may be provided to each of the projectors, and image a range including a projection range of each of the projectors.

According to the aspect of the invention with this configuration, the imaging section separate from the projector is unnecessary.

(7) In the aspect of the invention, the control device may make the projectors project a position detecting image used to detect a mutual positional relationship between the projectors at respective timings different from each other before making the adjusting images be projected.

According to the aspect of the invention with this configuration, what position in the taken image the adjusting image projected by the own projector is projected at can be measured in advance in each of the projectors.

(8) According to another aspect of the invention, a projector is provided. The projector is a projector classified to one of N (N is no smaller than 2) projector groups, and at least one of the N projector groups includes two or more projectors. The projector includes a projection section adapted to project an image on a projection surface, a control section, and an imaging section. The control section makes the projector groups project adjusting images on the projection surface at respective timings different from each other, and then makes the imaging section sequentially image the projection surface on which the adjusting images are projected, and performs control so that the plurality of projectors included in the one of the projector groups project the respective adjusting images at respective positions not adjacent to each other in the projection surface.

According to this aspect of the invention, since the two or more projectors for projecting the adjusting images at the same timing project the adjusting images at the respective positions not adjacent to each other in the projection surface, it is possible to perform correct measurement. Further, since the adjusting images are projected for each of the projector groups, it is possible to shorten the time for taking the adjusting images.

(9) According to still another aspect of the invention, an image adjustment method of a plurality of projectors adapted to project respective images arranged on a projection surface is provided. The image adjustment method includes (i) classifying the plurality of projectors into N (N is no smaller than 2) projector groups so that the projectors included in the same projector group project respective adjusting images at respective positions not adjacent to each other in the projection surface, (ii) projecting the adjusting images on the projection surface at timings different between the projector groups, and then sequentially imaging the projection surface on which the adjusting images are projected, and (iii) adjusting the images of the plurality of projectors using imaging data of the adjusting images. At least one of the N projector groups includes two or more projectors.

According to this aspect of the invention, since the two or more projectors for projecting the adjusting images at the same timing project the adjusting images at the respective positions not adjacent to each other in the projection surface, it is possible to perform correct measurement. Further, since the adjusting images are projected for each of the projector groups, it is possible to shorten the time for taking the adjusting images.

The invention can be realized in a variety of forms such as a projector, or an image adjustment method besides the projection system.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
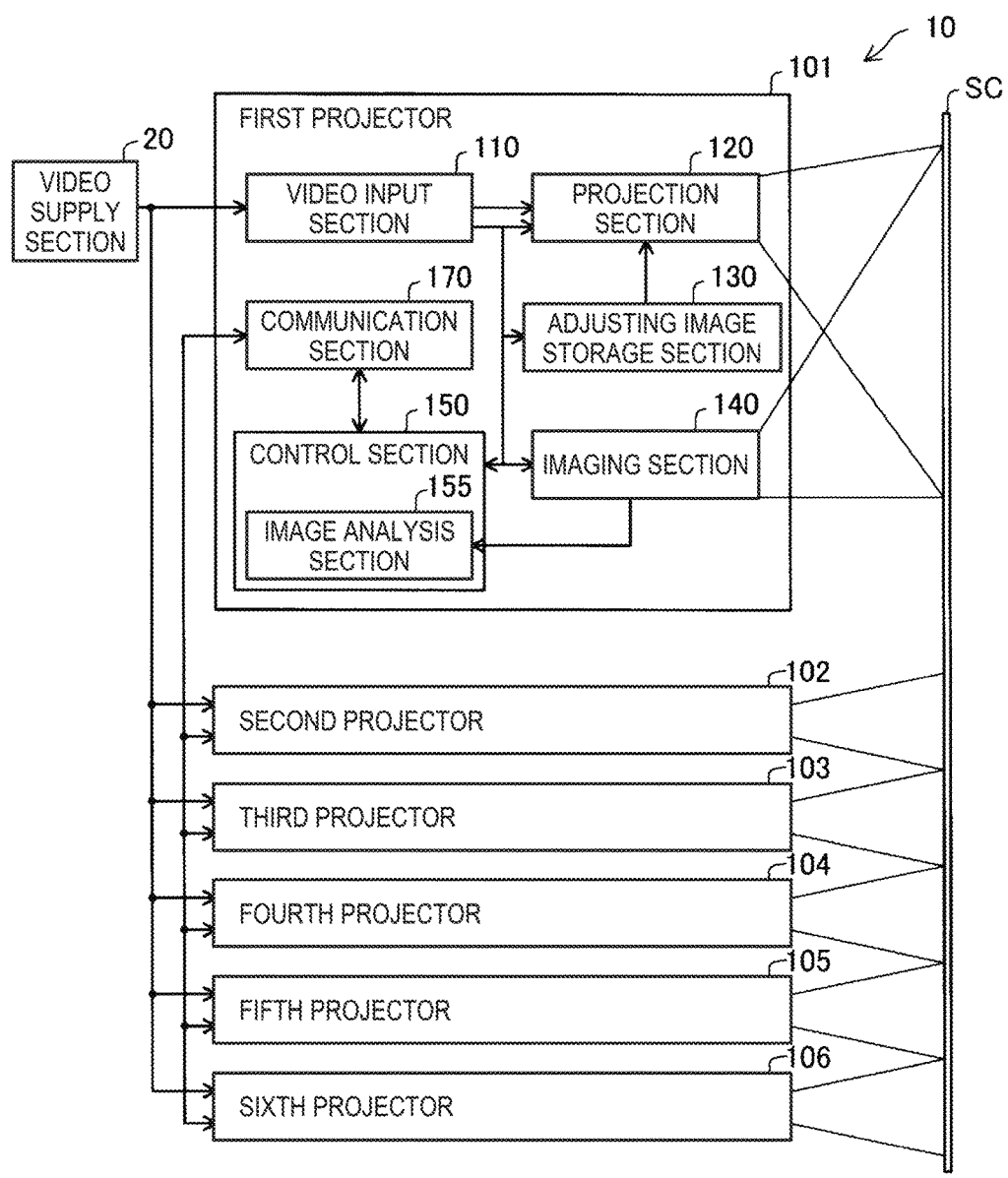
FIG. 1 is an explanatory diagram showing a projection system.

FIG. 1 is an explanatory diagram showing a projection system 10. The projection system 10 is provided with a video supply section 20, a plurality of projectors 101 through 106, and a projection surface SC. It is sufficient for the video supply section 20 to be a device such as a computer or a television capable of supplying a picture or an image to be projected by the projectors 101 through 106. As the projection surface SC, there can be used an interior wall, an exterior wall of a building, and so on besides the screen as long as there is provided a surface, on which the picture or the image projected by the projectors 101 through 106 can be projected.

The projectors 101 through 106 are capable of projecting the image obtained by dividing a large screen on the projection screen SC when receiving a supply of a picture or an image of the large screen from the video supply section 20. Although in the first embodiment, there are provided the six projectors 101 through 106, the number of projectors included in one projection system 10 can also be an arbitrary number. Since the configurations of the projectors 101 through 106 are the same as each other, the projector 101 will be described as an example. It should be noted that the projector 101 is referred to as a "first projector 101" in accordance with the trailing number of the reference numeral if need arises. It should be noted that the same applies to the projectors 102 through 106.

The projector 101 is provided with a video input section 110, a projection section 120, an adjusting image storage section 130, an imaging section 140, a control section 150, and a communication section 170. The control section 150 is provided with an image analysis section 155. The video input section 110 receives an input of a picture or an image from the video supply section 20. The projection section 120 projects the picture or the image on the projection surface SC. The adjusting image storage section 130 stores the adjusting image used when adjusting the images of the projectors 101 through 106. As the adjusting image, it is possible to use a solid image (also referred to as a "standard color image") of a predetermined color, or a pattern image including a mark such as a dot or a grid. The standard color image is used for the adjustment of the color of the projector. As the predetermined color, for example, red, blue, or green is used. The pattern image including the mark such as a dot or a grid is used for the correction of the position shift of the projection position between the projectors or a keystone correction.

It should be noted that one of the plurality of projectors 101 through 106 operates as a master projector, and the other projectors operate as slave projectors, and thus, it is possible for the plurality of projectors 101 through 106 to operate in a coordinated manner. On this occasion, the control section 150 of the master projector functions as a control device for controlling the overall operation of the plurality of projectors 101 through 106. In the following description, the term "control section 150" mainly means the control section 150 of the master projector. It should be noted that it is possible to arrange that there is disposed a control device for controlling the coordinated operation besides the control sections 150 of the projectors 101 through 106.

The imaging section 140 takes the adjusting image projected on the projection surface SC by the projection section 120. The imaging section 140 takes the image of a range including projection range of each of the projectors 101 through 106. It should be noted that it is preferable for the range to be imaged by the imaging section 140 to be slightly larger than the range of the projection by the projection section 120 of the own projector 101. The control section 150 has a function of controlling what part of the whole of the picture or the image of the large screen supplied is the area, projection of which is handled by each of the projectors 101 through 106. The image analysis section 155 generates correction data for each of the projectors 101 through 106 using the imaging data of the adjusting image of the projection surface SC taken by the imaging section 140. The communication section 170 obtains the imaging data of the adjusting images of the projection surfaces SC taken by the imaging sections 140 of the other projectors 102 through 106 from the other projectors 102 through 106, respectively, and at the same time, transmits the correction data to the other projectors 102 through 106. The communication section 170 of each of the projectors 101 through 106 further transmits and receives a variety of signals necessary for the mutual coordinated operation with the communication sections 170 of the other projectors.

Figure 2:
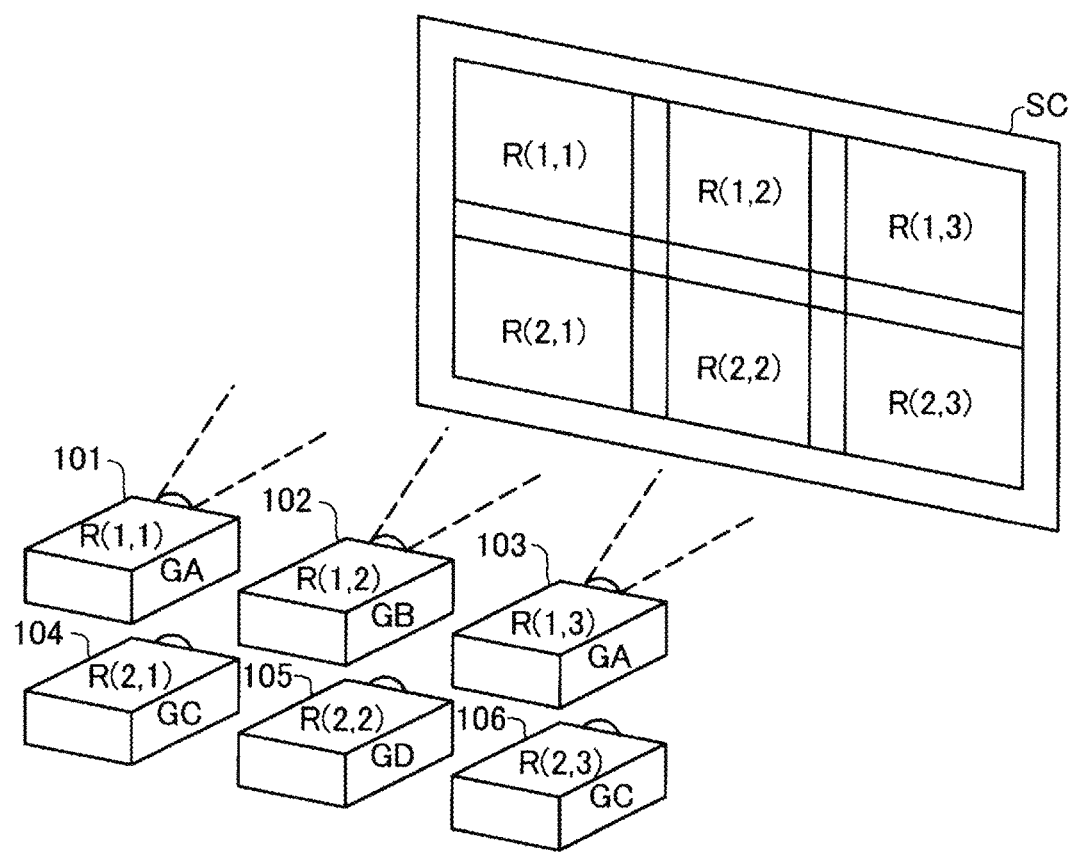
FIG. 2 is an explanatory diagram showing a positional relationship between a projector and a projection surface.

FIG. 2 is an explanatory diagram showing the positional relationship between the projectors 101 through 106 and the projection surface SC. In the first embodiment, there are the six projectors 101 through 106, and the images are projected on the projection surface SC in a 2×3 matrix. The top row is referred to as a "first row," the second top row is referred to as a "second row," the first column from the left is referred to as a "first column," the second column from the left is referred to as a "second column," and the third column from the left is referred to as a "third column." The character i of the range R(i, j) on the projection surface SC represents the row number, and the character j represents the column number. In the first embodiment, the first projector 101 projects the range R(1, 1), the second projector 102 projects the range R(1, 2), the third projector 103 projects the range R(1, 3), the fourth projector 104 projects the range R(2, 1), the fifth projector 105 projects the range R(2, 2), the sixth projector 106 projects the range R(2, 3).

The reference symbols "GA," "GB," "GC," and "GD" attached to the side surfaces of the projectors 101 through 106 represent projector groups to which the projectors belong. The first projector group GA includes the first projector 101 and the third projector 103, the second projector group GB includes the second projector 102, the third projector group GC includes the fourth projector 104 and the sixth projector 106, and the fourth projector group GD includes the fifth projector 105. Here, in the case in which, for example, a plurality of projectors is included in one projector group as in the first projector group GA, the projectors 101, 103 included are referred to as a "same-group projector." The plurality of the same group projectors 101, 103 projects the picture, the image, or the adjusting image at respective positions not adjacent to each other (respective positions separate from each other) in the projection surface SC. The same also applies to other projector groups. Further, the range R(1, 1) and the range R(1, 2), in which the first projector 101 and the second projector 102 as an example of the two projectors adjacent to each other perform projection, partially overlap each other, and in the overlapping area, the same images are projected. By overlapping the ranges to be projected, black lines can be prevented. It should be noted that the overlapping area where the projection ranges overlap each other is an area, which can be imaged by both of the imaging section 140 of the first projector 101 and the imaging section 140 of the second projector 102. The same applies to other projectors adjacent to each other.

Figure 3:
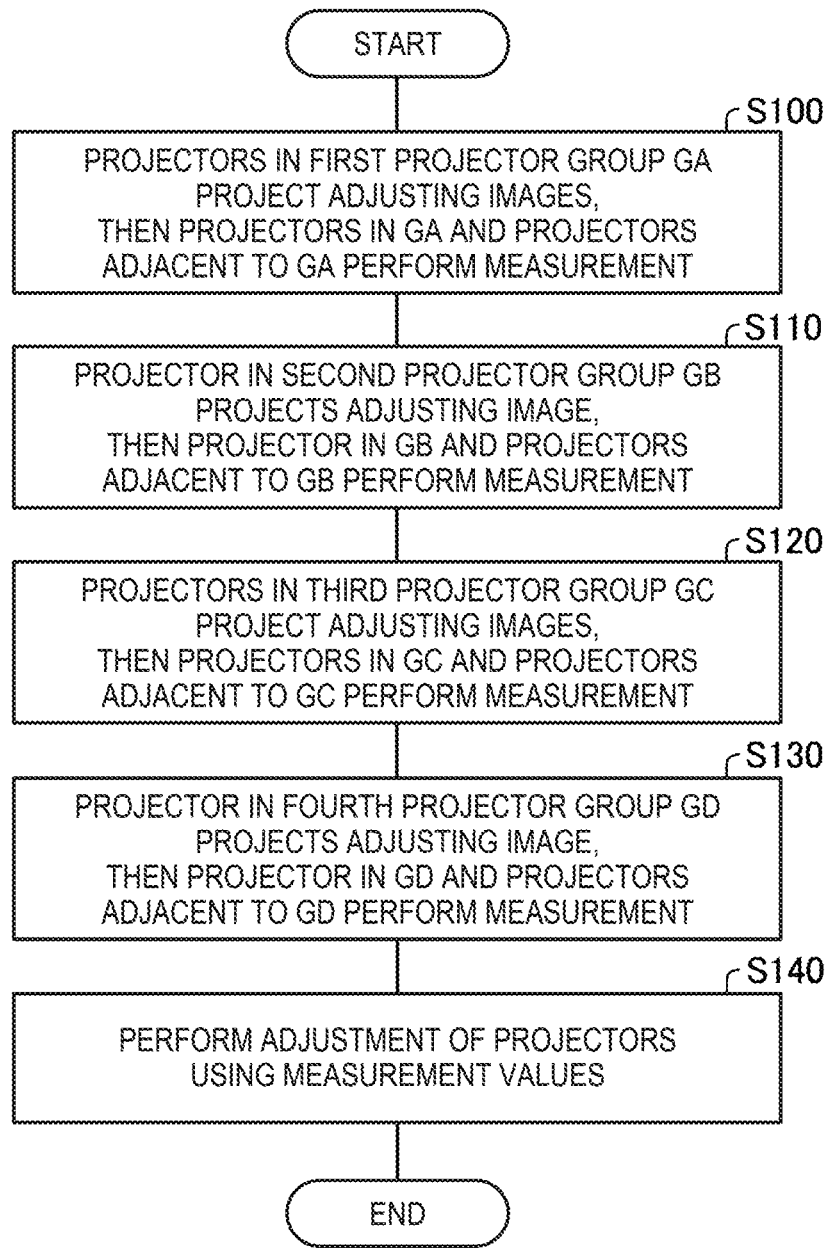
FIG. 3 is a flowchart of an image adjustment process according to a first embodiment of the invention.

FIG. 3 is a flowchart of an image adjustment process in the first embodiment. In the step S100, the control section 150 makes each of the projectors 101, 103 of the first projector group GA project the adjusting image, and then makes the imaging sections 140 of the projectors 101, 103 of the first projector group GA and the projectors 102, 104, and 106 adjacent to the projectors 101, 103 of the first projector group GA take the adjusting images thus projected. The control section 150 further makes the image analysis sections 155 analyze the taken images to obtain respective measurement values. In the case in which the adjusting image is the standard color image, the measurement value is the color of the taken image. In the case in which the adjusting image is the pattern image, the measurement value is the positional coordinate of the mark.

Figure 4:
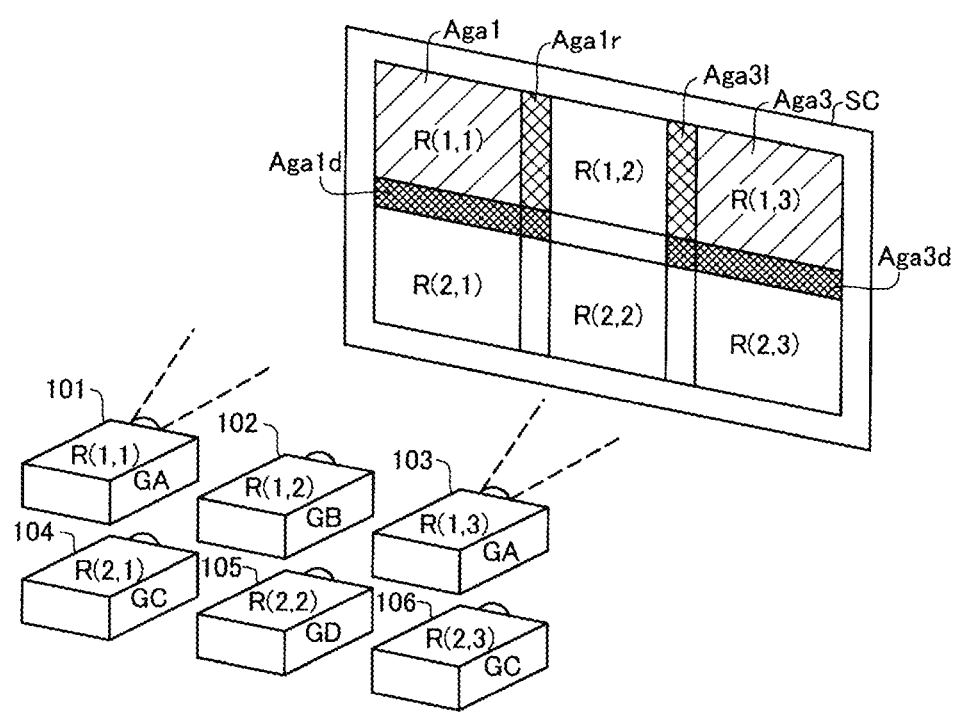
FIG. 4 is an explanatory diagram showing the state of the step S100 shown in FIG. 3.

FIG. 4 is an explanatory diagram showing the state of the step S100 shown in FIG. 3. The same adjusting images are projected respectively in the range R(1, 1) and the range R(1, 3) on the projection surface SC. The areas Aga1, Aga1r, and Aga1d are areas constituting the range R(1, 1) in which the first projector 101 performs projection. Among these areas, the area Aga1r is an overlapping area overlapping the range R(1, 2) in which the second projector 102 performs projection, and is the area imaged by both of the imaging section 140 of the first projector 101 and the imaging section 140 of the second projector 102. Further, the area Aga1d is an overlapping area overlapping the range R(2, 1) in which the fourth projector 104 performs projection, and is the area imaged by both of the imaging section 140 of the first projector 101 and the imaging section 140 of the fourth projector 104.

Similarly, the areas Aga3, Aga31, and Aga3d are the areas constituting the range R(1, 3) in which the third projector 103 performs projection, and among these areas, the area Ags31 is an overlapping area overlapping the range R(1, 2) in which the second projector 102 performs projection, and is imaged by both of the imaging section 140 of the third projector 102 and the imaging section 140 of the second projector 102. Further, the area Aga3d is an overlapping area overlapping the range R(2, 3) in which the sixth projector 106 performs projection, and is the area imaged by both of the imaging section 140 of the third projector 103 and the imaging section 140 of the sixth projector 106.

In the step S110 shown in FIG. 3, the control section 150 makes the projector 102 of the second projector group GB project the adjusting image, and then makes the projector 102 of the second projector group GB and the projectors 101, 103, and 105 adjacent to the projector 102 of the second projector group GB perform imaging and measurement of the adjusting images thus projected.

Figure 5:
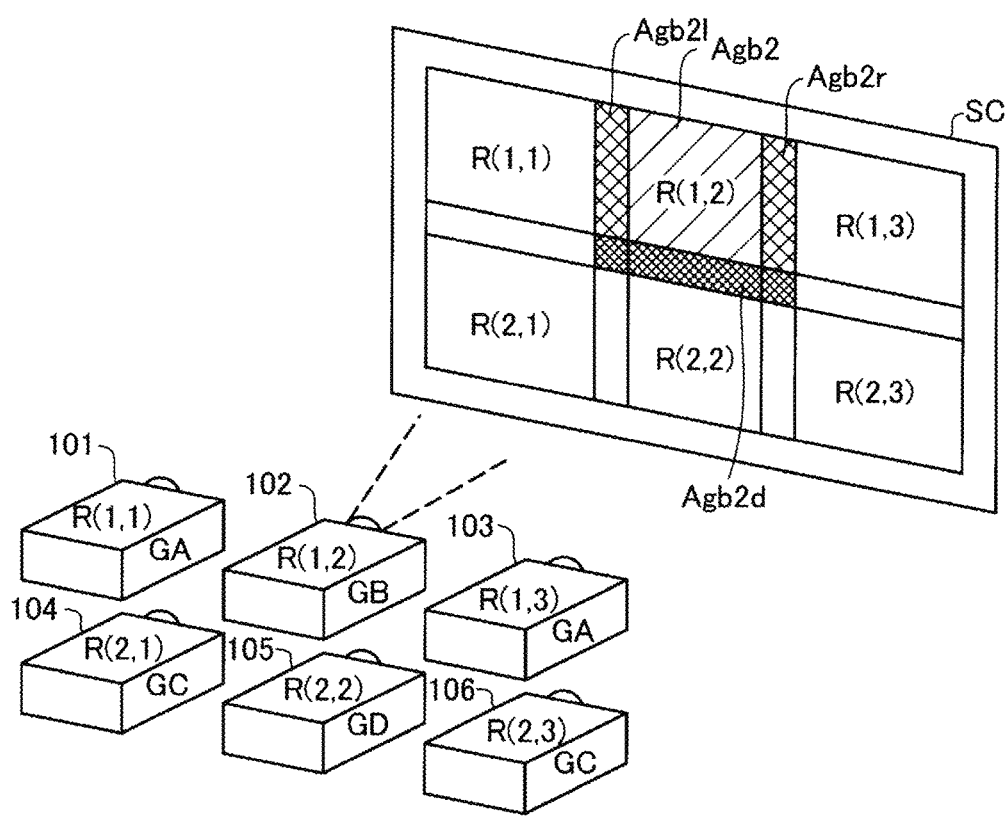
FIG. 5 is an explanatory diagram showing the state of the step S110 shown in FIG. 3.

FIG. 5 is an explanatory diagram showing the state of the step S110 shown in FIG. 3. The adjusting image is projected in the range R(1, 2) on the projection surface SC. The areas Agb2, Agb21, Agb2r, and Agb2d are areas constituting the range R(1, 2) in which the second projector 102 performs projection. Among these areas, the area Agb21 is an overlapping area overlapping the range R(1, 1) in which the first projector 101 performs projection, and is the area imaged by both of the imaging section 140 of the first projector 101 and the imaging section 140 of the second projector 102. Further, the area Agb2r is an overlapping area overlapping the range R(1, 3) in which the third projector 103 performs projection, and is the area imaged by both of the imaging section 140 of the second projector 102 and the imaging section 140 of the third projector 103. The area Agb2d is an overlapping area overlapping the range R(2, 3) in which the fifth projector 105 performs projection, and is the area imaged by both of the imaging section 140 of the second projector 102 and the imaging section 140 of the fifth projector 105.

In the step S120, the control section 150 makes each of the projectors 104, 106 of the third projector group GC project the adjusting image, and then makes the projectors 104, 106 of the third projector group GC and the projectors 101, 103, and 105 adjacent to the projectors 104, 106 of the third projector group GC perform imaging and measurement of the adjusting images thus projected. In the step S130, the control section 150 makes the projector 105 of the fourth projector group GD project the adjusting image, and then makes the projector 105 of the fourth projector group GD and the projectors 102, 104, and 106 adjacent to the projector 105 of the fourth projector group GD perform imaging and measurement of the adjusting images thus projected. It should be noted that the same can be applied to specific imaging areas on the projection surface SC in the steps S120, S130 as those shown in FIG. 3 and FIG. 4, and therefore, the explanation thereof will be omitted. As is understood from the steps described above, the control section 150 makes the projector groups project the adjusting images on the projection surface SC at respective timings different from each other, and makes the imaging sections 140 of the projectors having projected the adjusting images and the projectors adjacent to the projectors having projected that adjusting images sequentially take the image of the projection surface SC on which the adjusting images are projected. Further, a plurality of same-group projectors belonging to the same projector group performs projection of the adjusting images at the same timing.

In the step S140, the control section 150 performs an adjustment process of the projectors 101 through 106 using the measurement values measured by the imaging sections 140 of the respective projectors 101 through 106. Hereinafter, as an example of the adjustment process, an adjustment of the color using a red standard color image will be described. Regarding other colors, the adjustment can be achieved similarly to the red color.

In the step S100 in FIG. 3, the imaging section 140 of the first projector 101 and the imaging section 140 of the second projector 102 each obtain an RGB value of the overlapping area Aga1$r$. The RGB value can be an average value of the RGB values of the overlapping area Aga1$r$. The RGB value obtained by the imaging section 140 of the first projector 101 is defined as R11, and the RGB value obtained by the imaging section 140 of the second projector 102 is defined as R12.

The image analysis section 155 of the control section 150 calculates a correction coefficient KR2 of the sensitivity of the imaging section 140 of the second projector 102 relative to the imaging section 140 of the first projector 101 as KR2=R11/R12 based on the two RGB values R11, R12. Similarly, the image analysis section 155 calculates a correction coefficient KR4 of the sensitivity of the imaging section 140 of the fourth projector 104 relative to the imaging section 140 of the first projector 101 using the RGB value of the overlapping area Aga1$d$.

Similarly, the correction coefficient KR3' (KR3'=R22/R23) of the sensitivity of the imaging section 140 of the third projector 103 relative to the imaging section 140 of the second projector 102 based on the RGB values (R22 and R23) of the overlapping area Agb2$r$ in the step S110. Therefore, the correction coefficient KR3 of the sensitivity of the imaging section 140 of the third projector 103 relative to the imaging section 140 of the first projector 101 can be obtained as KR3=(R11/R12)×(R22/R23). Similarly, the correction coefficients KR2 through KR6 of the sensitivity of all of the other projectors 102 through 106 relative to the imaging section 140 of the first projector 101. The control section 150 transmits the correction coefficients to the other projectors 102 through 106. It is possible for the control sections 150 of the respective projectors 101 through 106 to know the own projection color by multiplying the color of the standard color image projected by itself by the correction coefficient. Then, there is obtained the correction data for adjusting the projection colors of the respective projectors so that the projection colors of the respective projectors become the same as each other. The picture input is corrected based on the correction data, and is then projected on the projection surface SC. According to this process, even in the case in the case in which the sensitivities of the imaging sections 140 of the plurality of projectors 101 through 106 are different from each other, it becomes possible to make the plurality of projectors 101 through 106 project the images roughly the same in color as each other.

As described hereinabove, according to the first embodiment, even if the plurality of same-group projectors included in the same projector group projects the adjusting images at the same time, the adjusting images do not interfere with each other, and it is possible to perform the measurement without any problem. Further, since it is sufficient to make the projector groups project the adjusting images equal number of times and imaging the adjusting images, the measurement time for imaging the adjusting images can be reduced.

As a method of classifying a plurality of projectors into a plurality of projector groups, some methods as described below, for example, can be adopted.

1. Matrix Arrangement

In the case in which the positions of the images projected by a plurality of projectors on the projection surface SC are arranged in a matrix, the projectors can also be classified into four projector groups based on whether the row number and the column number are each an even number or an odd number in the matrix arrangement. According to this method, it is possible to reduce the number of projector groups to shorten the time for taking the adjusting images.

2. Single Row Arrangement or Single Column Arrangement

In the case in which the positions of the images projected by the plurality of projectors on the projection surface SC are arranged in a single row or a single column, the plurality of projectors can also be classified into an odd-numbered projector group and an even-numbered projector group based on the arrangement position of the corresponding image. According to this method, since the projectors can be classified into the two projector groups, the number of steps of projecting and then taking the adjusting images can be set to two, and thus, the time for taking the adjusting images can be reduced.

Although in the present embodiment, the image analysis section 155 of the control section 150 is provided to each of the projectors 101 through 106, it is also possible to adopt a configuration in which the image analysis section 155 is provided only to a single projector, for example, the first projector 101. Further, it is also possible to configure the image analysis section 155 as a separate device from the projector.

Although in the present embodiment, each of the projectors 101 through 106 is provided with the imaging section 140, the imaging section 140 can also be provided separately from the projectors. It should be noted that in the case of providing the imaging section 140 to each of the projectors 101 through 106, the constituent elements of the projection system 10 is reduced, and at the same time, even in the case in which the number of the projectors increases to increase the projection area, there is no need to modify the imaging section 140.

In the first embodiment, assuming that the imaging sections 140 of the respective projectors 101 through 106 are different in sensitivity, the correction coefficient and the correction data are calculated using the data of the taken image of the overlapping area where the projection ranges of the adjacent projectors overlap each other. However, in the case in which the sensitivities of the imaging sections 140 of the respective projectors 101 through 106 are roughly the same, it is also possible to obtain the correction data by, for example, measuring the RGB values of the central areas Aga1, Agb2 located at the center of the projection range. In this case, it is also possible to arrange that only the projectors projecting the adjusting images perform imaging.

Second Embodiment

Figure 6:
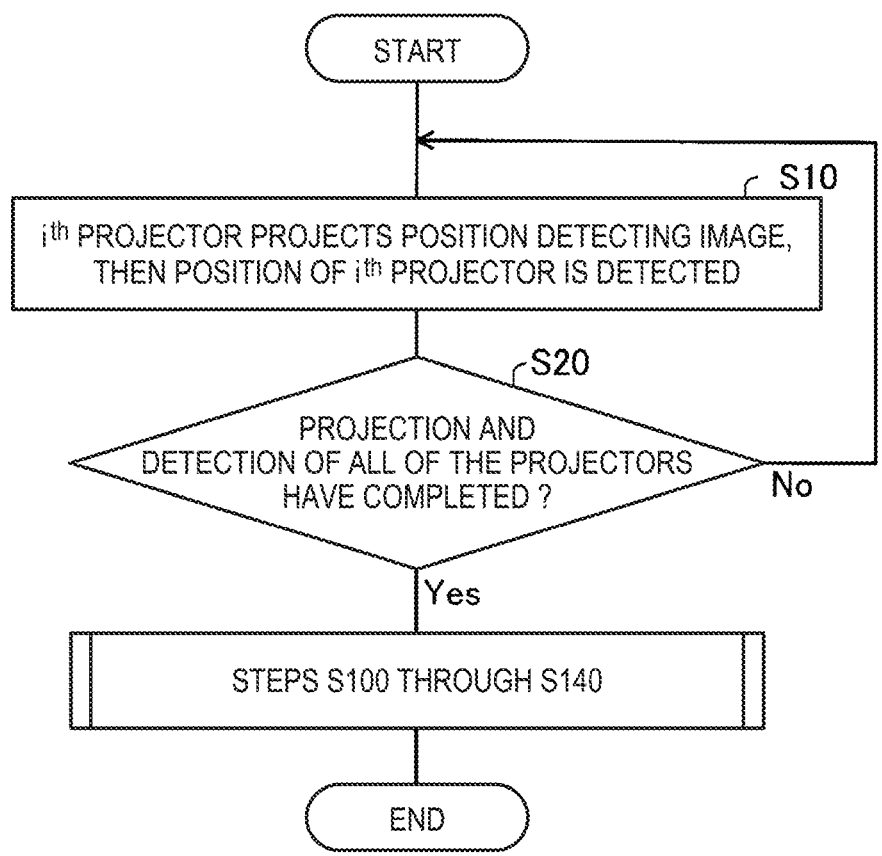
FIG. 6 is a flowchart of an image adjustment process according to a second embodiment of the invention.

FIG. 6 is a flowchart of an image adjustment process in a second embodiment. The second embodiment is different in the point that the steps S10, S20 are performed before the steps S100 of the flowchart of the first embodiment shown in FIG. 3. Therefore, the steps S10, S20 will be described here.

In the step S10, the control section 150 makes the $i^{th}$ projector (i represents either one of 1 through 6) project position detecting image (e.g., a solid white image) for detecting the mutual positional relationship, and then detects what position in the projection surface SC the position detecting image is projected at with the imaging section 140 of the $i^{th}$ projector. Here, the value i sequentially takes 1 through the largest number corresponding to the number of projectors ("6" in the second embodiment). In the step S20, the control section 150 determines whether or not the projection and the detection by all of the projectors have been completed. If they have been completed, the process proceeds to the steps S100 through S140 described with reference to FIG. 3, and if not, the process returns to the step S10.

Figure 7:
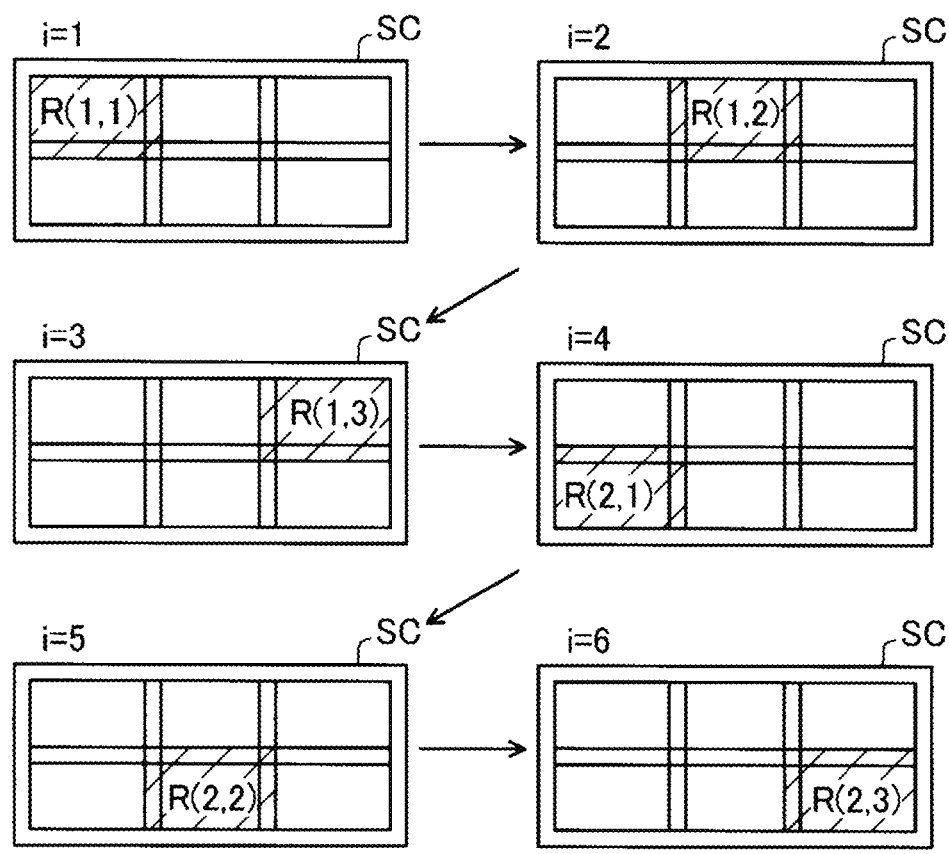
FIG. 7 is an explanatory diagram showing an example of the state in which the projectors perform projection in sequence in the steps S10, S20 in FIG. 6.

FIG. 7 is an explanatory diagram showing an example of the state in which the projectors perform projection in sequence in the steps S10, S20 in FIG. 6. It should be noted that FIG. 7 shows an example in which a first projector (i=1) corresponds to the first projector 101, and performs projection in the range R(1, 1) on the projection surface SC, and a second projector (i=2) corresponds to the second projector 102, and performs projection in the range R(1, 2) on the projection surface SC.

In general, the position and the size of the picture, which has been projected by the own projector, and shows in the taken image of the imaging section 140, vary due to the projection distance, the zoom lens shift of the projection lens (not shown) of the projection section 120, and so on. Therefore, unless what position in the taken image of the imaging section 140 the picture projected by the own projector shows has been measured and recognized in advance, there is a possibility of taking the adjusting image projected by another projector belonging to the same projector group for the adjusting image projected by the own projector when performing the measurement. According to the second embodiment, since it is possible to measure and recognize, in advance, where the adjusting image projected by the own projector is projected in the taken image of the imaging section 140 in each of the projectors, there is no chance of taking the adjusting image projected by another projector belonging the same projector group for the adjusting image projected by the own projector in performing the measurement.

It should be noted that it is also possible to arrange that the user of the projectors 101 through 106 inputs the respective projection positions using input panels (not shown) of the projectors 101 through 106 or a remote controller (not shown) instead of performing the steps S10, S20 shown in FIG. 6.

Third Embodiment

Figure 8:
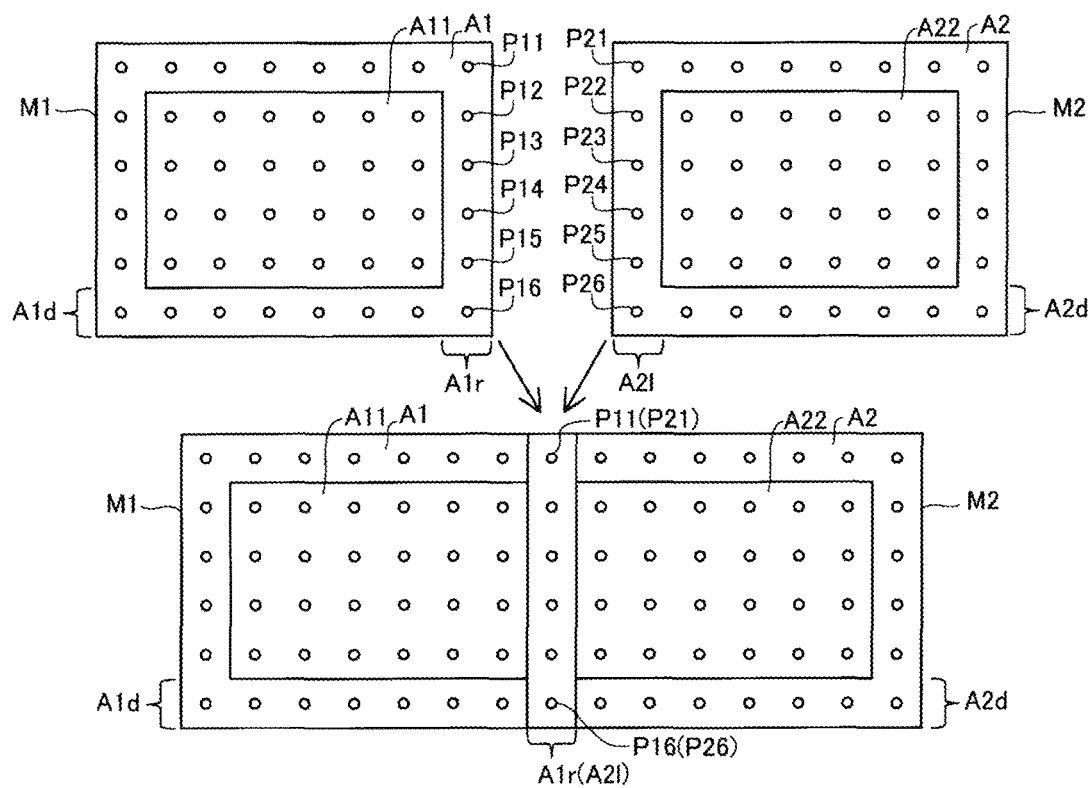
FIG. 8 is a diagram showing an example of an adjusting image in the third embodiment of the invention.

FIG. 8 shows an example of an adjusting image in the third embodiment. In the first and second embodiments, the color adjustment is described as an example. In the third embodiment, the position shift is corrected. The upper part of FIG. 8 shows adjusting images M1, M2 projected by the first projector 101 and the second projector 102. Although the two adjusting images M1, M2 are shown for the sake of convenience, these two adjusting images M1, M2 are not projected at the same time, but are projected at respective timings different from each other. Further, the two adjusting images M1, M2 are drawn separately from each other, but in reality are projected at positions partially overlapping each other as shown in the lower part of FIG. 8. The central area A11 in the range A1, in which the first projector 101 performs projection, is an area, which does not overlap the projection ranges of other projectors.

The overlapping area A1r is an area overlapping the range A2 in which the second projector 102 performs projection. In the overlapping area A1r, there are projected six dots P11 through P16. The overlapping area A1d is an area overlapping the range in which the fourth projector 104 performs projection. The central area A22 in the range A2, in which the second projector 102 performs projection, is an area, which does not overlap the projection ranges of other projectors. The overlapping area A21 is an area overlapping the range A1 in which the first projector 101 performs projection. In the overlapping area A21, there are projected six dots P21 through P26. The overlapping area A2d is an area overlapping the range in which the fifth projector 105 performs projection. It should be noted that the two overlapping areas A1r, A21 are the same area.

Similarly to the first embodiment, the control section 150 makes the first projector 101 of the first projector group GA project the adjusting image to obtain the coordinates of the six dots P11 through P16 in the overlapping area A1r. Then, the control section 150 makes the second projector 102 of the second projector group GB project the adjusting image to obtain the coordinates of the six dots P21 through P26 in the overlapping area A21. The image analysis section 155 performs expansion, contraction, shift of the projection position, and rotation of the adjusting image so that the six dots P11 through P16 and the six dots P21 through P26 respectively overlap each other. Thus the shift in the projection position between the first projector 101 and the second projector 102. It should be noted that it is also possible to perform adjustment of the position shift between other projectors adjacent to each other in a similar manner. Further, besides the adjustment of the position shift, the keystone correction can also be performed.

Although the embodiments of the invention is hereinabove described based on some specific examples, the embodiments of the invention described above are only for making it easy to understand the invention, but not for limiting the scope of the invention. It is obvious that the invention can be modified or improved without departing from the scope of the invention and the appended claims, and that the invention includes the equivalents thereof.

What is claimed is:

1. A projection system comprising:
  a plurality of projectors adapted to project respective images arranged on a projection surface;

a control device; and a plurality of imaging sections, each of which corresponds to at least one projector of the plurality of projectors and each of which images a range including a projection range of the projector to which each imaging section corresponds, wherein the plurality of projectors is classified into N (N is no smaller than 2) projector groups, the control device makes the projector groups project adjusting images on the projection surface at respective timings different from each other, and then makes the plurality of imaging sections sequentially image the projection surface on which the adjusting images are projected, at least one of the N projector groups includes two or more projectors, and the two or more projectors project the adjusting images at respective positions not adjacent to each other in the projection surface, and a first adjusting image of the adjusting images projected on the projection surface is imaged by both a first imaging section of a first projector of the plurality of projectors that is projecting the first adjusting image and a second imaging section of a second projector adjacent to the first projector, and is not imaged by a third imaging section of a third projector that is not adjacent to the first projector.

2. The projection system according to claim 1, wherein the control device performs an image adjustment, which includes at least one of an adjustment of a color projected and an adjustment of a position shift of the image projected, on each of the projectors based on images taken by at least some of the plurality of imaging sections.

3. The projection system according to claim 1, wherein in a case in which the value of N is 4, and the positions of the images projected on the projection surface by the plurality of projectors are arranged in a matrix, the plurality of projectors is classified into four projector groups based on whether a row number and a column number of an arrangement position of the image in the matrix arrangement of the images are each an even number or an odd number.

4. The projection system according to claim 1, wherein in a case in which the value of N is 2, and the positions of the images projected on the projection surface by the plurality of projectors are arranged in one of a single row and a single column, the plurality of projectors is classified into two projector groups based on whether an arrangement position of the image in the arrangement of the images is an even-numbered position or an odd-numbered position.

5. The projection system according to claim 1, wherein the control device is a control section provided to one of the projectors.

6. The projection system according to claim 1, wherein the control device makes the projectors project a position detecting image used to detect a mutual positional relationship between the projectors at respective timings different from each other before making the adjusting images be projected.

7. A projector to be classified to one of N (N is no smaller than 2) projector groups, at least one of the N projector groups including two or more projectors, the projector comprising:

a projection section adapted to project an image on a projection surface;

a control section which controls a plurality of projectors adapted to project respective images arranged on the projection surface and a plurality of imaging sections, each of which corresponds to at least one projector of the plurality of projectors and each of which images a range including a projection range of the projector to which each imaging section corresponds; and an imaging section, wherein the control section makes the projector groups project adjusting images on the projection surface at respective timings different from each other, and then makes the plurality of imaging sections sequentially image the projection surface on which the adjusting images are projected, and performs control so that the plurality of projectors included in the one of the projector groups project the respective adjusting images at respective positions not adjacent to each other in the projection surface, and wherein a first adjusting image of the adjusting images projected on the projection surface is imaged by both a first imaging section of a first projector of the plurality of projectors that is projecting the first adjusting image and a second imaging section of a second projector adjacent to the first projector, and is not imaged by a third imaging section of a third projector that is not adjacent to the first projector.

8. An image adjustment method of a plurality of projectors adapted to project respective images arranged on a projection surface, each of the plurality of projectors including an imaging section which images a range including a projection range of the projector to which the imaging section corresponds, the method comprising:

(i) classifying the plurality of projectors into N (N is no smaller than 4) projector groups so that the projectors included in the same projector group project respective adjusting images at respective positions not adjacent to each other in the projection surface;

(ii) projecting the adjusting images on the projection surface at timings different between the projector groups, and then sequentially imaging the projection surface on which the adjusting images are projected; and (iii) adjusting the images of the plurality of projectors using imaging data of the adjusting images, wherein at least one of the N projector groups includes two or more projectors, and a first adjusting image of the adjusting images projected on the projection surface is imaged by both a first imaging section of a first projector of the plurality of projectors that is projecting the first adjusting image and a second imaging section of a second projector adjacent to the first projector, and is not imaged by a third imaging section of a third projector that is not adjacent to the first projector.

9. A projector to be classified to one of N (N is no smaller than 4) projector groups, at least one of the N projector groups including two or more projectors which project respective images on a projection surface, the projector comprising:

a projection section adapted to project an image on the projection surface;

a control section; and an imaging section,
wherein the control section
- makes the projector groups project adjusting images on the projection surface at respective timings different from each other, and then makes the imaging section sequentially image the projection surface on which the adjusting images are projected, and
- performs control so that the plurality of projectors included in the one of the projector groups project the respective adjusting images at respective positions not adjacent to each other in the projection surface, and wherein
- the positions of the images projected on the projection surface by the plurality of projectors are arranged in a matrix, and
- the plurality of projectors is classified into four projector groups based on whether a row number and a column number of an arrangement position of the image in the matrix arrangement of the images are each an even number or an odd number.

10. An image adjustment method of a plurality of projectors adapted to project respective images arranged on a projection surface, the method comprising:

(i) classifying the plurality of projectors into N (N is no smaller than 4) projector groups so that the projectors included in the same projector group project respective adjusting images at respective positions not adjacent to each other in the projection surface;

(ii) projecting the adjusting images on the projection surface at timings different between the projector groups, and then sequentially imaging the projection surface on which the adjusting images are projected; and (iii) adjusting the images of the plurality of projectors using imaging data of the adjusting images, wherein
- at least one of the N projector groups includes two or more projectors,
- the positions of the images projected on the projection surface by the plurality of projectors are arranged in a matrix, and
- the plurality of projectors is classified into four projector groups based on whether a row number and a column number of an arrangement position of the image in the matrix arrangement of the images are each an even number or an odd number.

* * * * *